United States Patent
Ono (10) Patent No.: US 10,978,888 B2
(45) Date of Patent: Apr. 13, 2021

(54) BATTERY SYSTEM FOR SWITCHING CONNECTION STATES OF BATTERY MODULES

(71) Applicant: Toyota Jidosha Kabushiki Kaisha, Toyota (JP)

(72) Inventor: Tomoya Ono, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 220 days.

(21) Appl. No.: 16/253,794

(22) Filed: Jan. 22, 2019

(65) Prior Publication Data

US 2019/0229541 A1 Jul. 25, 2019

(30) Foreign Application Priority Data

Jan. 23, 2018 (JP) .............................. JP2018-008905

(51) Int. Cl.
*H02J 7/00* (2006.01)
*B60L 58/18* (2019.01)
*B60L 58/14* (2019.01)
*B60L 58/19* (2019.01)

(52) U.S. Cl.
CPC ............ *H02J 7/0024* (2013.01); *B60L 58/14* (2019.02); *B60L 58/18* (2019.02); *B60L 58/19* (2019.02); *H02J 7/0021* (2013.01)

(58) Field of Classification Search
CPC ....... H02J 7/0024; H02J 7/0021; B60L 58/19; B60L 58/18; B60L 58/14
USPC ........................................................ 320/117
See application file for complete search history.

(56) References Cited

U.S. PATENT DOCUMENTS

| 5,418,402 | A | * | 5/1995 | Fujiwara | ............... H02J 7/1438 307/10.1 |
| 5,712,553 | A | * | 1/1998 | Hallberg | ............... H02J 7/0024 307/75 |
| 6,034,506 | A | * | 3/2000 | Hall | ...................... H02J 7/0019 320/101 |
| 7,705,491 | B2 | * | 4/2010 | King | ...................... B60L 58/26 307/80 |
| 7,733,059 | B2 | * | 6/2010 | Yoshida | ............... G01R 31/396 320/118 |
| 8,307,222 | B2 | * | 11/2012 | Wang | ...................... G06F 1/28 713/300 |

(Continued)

FOREIGN PATENT DOCUMENTS

| CN | 106055534 A | 10/2016 |
| JP | 10302846 A * | 11/1998 |

(Continued)

*Primary Examiner* — John T Trischler
(74) *Attorney, Agent, or Firm* — Dinsmore & Shohl LLP (57) ABSTRACT

A battery system including: a plurality of battery modules; a plurality of switches configured to switch a connection state of the plurality of battery modules between a series state and a parallel state; and an electronic control unit configured: to control switching of the plurality of switches; and to fix ON-OFF states of the plurality of switches such that the connection state of the plurality of battery modules is the series state or the parallel state when a deterioration parameter indicating a degree of deterioration of a predetermined battery module out of the plurality of battery modules reaches a threshold value, the ON-OFF state representing a state in which a switch is open or closed.

8 Claims, 6 Drawing Sheets

(56) References Cited

U.S. PATENT DOCUMENTS

| | | | | |
|---|---|---|---|---|
| 8,330,420 B2* | 12/2012 | Kim | | H02J 7/0024 320/122 |
| 8,350,413 B1* | 1/2013 | Tsukamoto | | B60L 58/22 307/71 |
| 8,427,099 B2* | 4/2013 | Wong | | H02J 7/0018 320/107 |
| 8,928,174 B2* | 1/2015 | Muto | | H02J 7/0024 307/71 |
| 9,493,090 B2* | 11/2016 | Timmons | | B60L 50/61 |
| 9,673,431 B2* | 6/2017 | Despesse | | H01M 10/4207 |
| 2002/0070707 A1* | 6/2002 | Sato | | H01M 10/46 320/134 |
| 2003/0055666 A1* | 3/2003 | Roddy | | G06Q 10/06395 705/305 |
| 2006/0092583 A1* | 5/2006 | Alahmad | | H02J 7/0024 361/15 |
| 2008/0143298 A1* | 6/2008 | Yoshida | | H02J 7/0026 320/136 |
| 2009/0021221 A1* | 1/2009 | Krauer | | B60L 1/08 320/153 |
| 2009/0206679 A1* | 8/2009 | King | | B60L 3/12 307/125 |
| 2010/0261048 A1* | 10/2010 | Kim | | B60L 58/12 429/150 |
| 2010/0305792 A1* | 12/2010 | Wilk | | B60W 10/26 701/22 |
| 2011/0118916 A1* | 5/2011 | Gullichsen | | B60K 6/28 701/22 |
| 2011/0181245 A1* | 7/2011 | Wey | | H02J 7/0019 320/118 |
| 2011/0208567 A9* | 8/2011 | Roddy | | G06Q 10/20 705/7.41 |
| 2012/0013180 A1* | 1/2012 | Muto | | B60L 58/19 307/9.1 |
| 2012/0038315 A1* | 2/2012 | Wong | | H02J 7/0018 320/107 |
| 2014/0015488 A1* | 1/2014 | Despesse | | B60L 58/12 320/122 |
| 2014/0077595 A1* | 3/2014 | Kakuya | | H02J 7/0024 307/24 |
| 2014/0097797 A1* | 4/2014 | Hendrix | | H01M 10/482 320/118 |
| 2014/0287278 A1* | 9/2014 | Despesse | | H01M 10/4257 429/7 |
| 2015/0207347 A1* | 7/2015 | Hori | | G01R 31/385 320/118 |
| 2015/0323610 A1* | 11/2015 | Ahn | | H02J 7/0021 320/152 |
| 2016/0046200 A1 | 2/2016 | Timmons et al. | | |
| 2017/0117721 A1* | 4/2017 | Toya | | H02J 7/0016 |
| 2017/0201102 A1* | 7/2017 | Hikosaka | | H02J 7/0019 |
| 2017/0305289 A1* | 10/2017 | Meitinger | | B60L 53/62 |
| 2017/0368958 A1* | 12/2017 | Eun | | B60L 58/20 |
| 2018/0175640 A1* | 6/2018 | Lee | | H01M 10/42 |
| 2018/0316198 A1* | 11/2018 | Niizuma | | H02J 7/0024 |
| 2019/0070971 A1* | 3/2019 | Kusumi | | B60L 53/60 |
| 2019/0199108 A1* | 6/2019 | Hiroe | | H01M 10/441 |
| 2019/0225095 A1* | 7/2019 | Hiroe | | G01R 31/382 |
| 2019/0225109 A1* | 7/2019 | Ono | | B60L 3/0046 |

FOREIGN PATENT DOCUMENTS

| | | | |
|---|---|---|---|
| JP | 3721706 B2 * | 11/2005 | |
| JP | 2013-081316 A | 5/2013 | |
| JP | 2013081316 A * | 5/2013 | ............. B60L 58/19 |

* cited by examiner

| STATE OF VEHICLE | SMR | SWITCHING RELAY | | | BATTERY STATE |
|---|---|---|---|---|---|
| | | R1 | R2 | R3 | |
| DURING TRAVELING | ON | ON | OFF | ON | PARALLEL |
| LEFT-ALONE PERIOD | OFF | OFF | ON | OFF | SERIES |
| DURING EXTERNAL CHARGING | ON | OFF | ON | OFF | SERIES |

BATTERY SYSTEM FOR SWITCHING CONNECTION STATES OF BATTERY MODULES

CROSS-REFERENCE TO RELATED APPLICATION

This application claims to Japanese Patent Application No. 2018-008905 filed on Jan. 23, 2018, incorporated herein by reference in its entirety.

BACKGROUND

1. Technical Field

The disclosure relates to a battery system and more particularly to a technique of switching a connection mode of a plurality of battery modules using a plurality of switches.

2. Description of Related Art

Japanese Unexamined Patent Application Publication No. 2013-81316 UP 2013-81316 A) discloses a power supply device in which a connection mode (series/parallel) of a plurality of battery modules can be switched depending on ON-OFF states of a plurality of switches and a control device thereof. The control device described in JP 2013-81316 A is configured to switch the connection mode of a plurality of battery modules based on a temperature, a state of charge (SOC), or the like of the power supply device.

SUMMARY

Switching control of a switch which is used in a battery system may not be possible (that is, the switch may be unable to be controlled). For example, when an electromagnetic mechanical relay is used as a switch and an operation of switching a switch in an open state to a closed state or switching a switch in a closed state to an open state (hereinafter referred to as a "switching operation") is frequently performed, deterioration of the relay is likely to progress. When deterioration of a relay progresses, the relay may be stuck in the closed state (hereinafter referred to as "stuck closed") or may be stuck in the open state (hereinafter referred to as "stuck open"). When a relay is stuck closed or is stuck open, a control device cannot control switching of the relay.

In the battery system described in JP 2013-81316 A, when switching control of a relay that switches a connection mode of a plurality of battery modules is not possible, the connection state of the battery modules cannot be changed. Accordingly, it is difficult to continuously use the battery system depending on the ON-OFF states of the switches when the switching control is not possible.

The disclosure provides a battery system that can appropriately restrain the battery system from becoming unusable because switching control of a switch which is used to switch a connection mode of a plurality of battery modules is not possible.

An aspect of the present disclosure relates to a battery system including: a plurality of battery modules; a plurality of switches configured to switch a connection state of the plurality of battery modules between a series state and a parallel state, the series state being a state in which the plurality of battery modules is connected in series, the parallel state being a state in which the plurality of battery modules is connected in parallel; and an electronic control unit configured: to control switching of the plurality of switches; and to fix ON-OFF states of the plurality of switches such that the connection state of the plurality of battery modules is the series state or the parallel state when a deterioration parameter indicating a degree of deterioration of a predetermined battery module out of the plurality of battery modules reaches a threshold value, the ON-OFF state representing a state in which a switch is open or closed.

In the following description, the predetermined battery module in the battery system may be referred to as a "target module." The target module may be all or a part (for example, one battery module) of a plurality of battery modules included in the battery system.

Determination of whether the deterioration parameter has reached the threshold value may be referred to as "deterioration determination." Examples of the deterioration parameter include an inter-terminal voltage when external charging of a target module has been completed which will be described later in addition to an elapsed time from start of use of the target module and a capacity of the target module. "Fix" means that the ON-OFF state of each switch is not changed (is maintained) unless a cancel condition has been satisfied.

Since the ON-OFF state of each switch is fixed as described above and the switching operation of each switch is not performed, it is possible to restrain deterioration of each switch. However, when the ON-OFF state of each switch is fixed, the connection state of the battery modules cannot be changed. Accordingly, it is not preferable for the fixing time to be too early. On the other hand, when the fixing time is too late, the likelihood of switching control of a switch becoming impossible due to deterioration of the switch becomes higher.

In the battery system, the time at which the ON-OFF state of each switch is fixed is determined using the deterioration parameter indicating a degree of deterioration of the target module. Each switch which is used to switch the connection mode of a plurality of battery modules in the battery system is used in substantially the same environment and conditions as the battery modules. By using this fact, the degree of deterioration of each switch can be estimated from the degree of deterioration of the target module. Accordingly, the ON-OFF state of each switch can be fixed at a time which is slightly earlier than the time at which switching control is not possible due to deterioration of each switch by using the deterioration parameter.

By fixing the ON-OFF state of each switch at an appropriate time as described above, it is possible to restrain deterioration of a switch before switching control of the switch becomes impossible while enabling change of the connection state of the battery modules for a long time. Accordingly, it is possible to appropriately reduce the possibility of the battery system becoming unusable due to switching control of a switch, which is used to switch the connection mode of the battery modules, being not possible.

In the battery system, the connection mode (series/parallel) of a plurality of battery modules can be changed using a plurality of switches before the ON-OFF states of the plurality of switches are fixed. For example, by connecting a plurality of battery modules in series, a rated voltage of a power storage assembly in which the battery modules are connected can be increased.

In the following description, power storage assemblies in which a plurality of battery modules included in the battery system are connected in series and in parallel may be referred to as a "series power storage assembly" and a "parallel power storage assembly," respectively.

In the above aspect, the electronic control unit may be configured to fix the ON-OFF states of the plurality of switches such that the connection state of the plurality of battery modules is the series state when the deterioration parameter reaches the threshold value.

The rated voltage of a battery module decreases as deterioration of the battery module progresses. That is, in a state in which deterioration of a battery module has progressed, the rated voltage of a series power storage assembly is lower than that in an initial state (in an unused state and immediately after use thereof is started). Accordingly, in an application in which the voltage of a series power storage assembly is excessively high in the initial state and thus a parallel power storage assembly is used, a series power storage assembly can be used. In an application in which a parallel power storage assembly is used in an initial state, the voltage of the parallel power storage assembly may be excessively low in a situation in which deterioration of the battery module has progressed. In this case, it may be possible to secure a sufficient voltage by using a series power storage assembly instead of the parallel power storage assembly.

The electronic control unit may perform switching control of a plurality of switches such that a plurality of battery modules are in the series state when the deterioration parameter reaches the threshold value. Deterioration determination may be performed at the time at which the plurality of battery modules are in the series state, and the series state may be maintained when it is determined that the deterioration parameter has reached the threshold value. Examples of the time at which the plurality of battery modules are in the series state include during charging in the battery system and after charging has been completed which will be described later.

In the above aspect, the plurality of battery modules may be configured to be able to be charged with electric power of a power supply outside the plurality of battery modules; and the electronic control unit may be configured to: maintain or change the ON-OFF states of the plurality of switches such that the connection state of the plurality of battery modules is the series state when an operation for starting charging using the power supply has been performed in a situation in which the ON-OFF states of the plurality of switches have not been fixed; and fix the ON-OFF states of the plurality of switches such that the connection state of the plurality of battery modules is the series state when the deterioration parameter reaches the threshold value while charging using the power supply is being performed or after the charging has been completed. In the following description, charging of a battery module with electric power of an external power source outside the plurality of battery modules may be referred to as "external charging."

Since a parallel power storage assembly has a configuration in which a plurality of battery modules are connected in parallel, the rated voltage of the parallel power storage assembly is low. For example, during traveling of the vehicle, conversion efficiency of a power conversion unit (an inverter) is likely to increase and power efficiency (a rate of electric power consumption) in traveling of the vehicle is likely to increase with supply of electric power with a low voltage to a travel driving unit of the vehicle from the parallel power storage assembly.

On the other hand, since a series power storage assembly has a configuration in which a plurality of battery modules are connected in series, the rated voltage of the series power storage assembly increases. The series power storage assembly can be charged with a DC charging facility that supplies electric power with a high voltage. By performing external charging using electric power with a high voltage, it is possible to decrease a current flowing in a charging cable or an onboard circuit during charging. Since a current flowing therein decreases, charging efficiency is enhanced. Accordingly, when an operation for starting charging using an external power supply is performed and charging of the series power storage assembly is possible, it is preferable to perform charging of the series power storage assembly. Examples of the case in which charging of the series power storage assembly is not possible include a case in which a DC charging facility does not support charging of a series power storage assembly.

In the battery system, when an operation for starting charging using an external power supply is performed in a situation in which the ON-OFF states of a plurality of switches are not fixed, a plurality of battery modules are in the series state. When charging of a series power storage assembly is possible, charging of the series power storage assembly is performed in that state. Accordingly, there is a high likelihood of the plurality of battery modules being in the series state during charging. In such a battery system, when the electronic control unit performs deterioration determination while charging using an external power supply is being performed or after the charging has been completed (for example, immediately after the charging has been completed), there is a high likelihood of the plurality of battery modules being in the series state at the time of deterioration determination. Accordingly, when it is determined by deterioration determination that the deterioration parameter reaches the threshold value and the ON-OFF states of the switches are fixed in the charging state, there is a high likelihood of the ON-OFF states of the switches being fixed with the plurality of battery modules in the series state. Accordingly, it is possible to reduce a risk of switching control of the switches becoming impossible due to a switching operation of a deteriorated switch.

In the above aspect, the plurality of battery modules may be configured to be able to be charged with electric power of a power supply outside the plurality of battery modules; and the electronic control unit may be configured to: maintain or change the ON-OFF states of the plurality of switches such that the connection state of the plurality of battery modules is the parallel state when an operation for starting charging using the power supply has been performed in a situation in which the ON-OFF states of the plurality of switches have not been fixed and a voltage of the power supply is equal to or lower than a predetermined voltage value; and fix the ON-OFF states of the plurality of switches such that the connection state of the plurality of battery modules is the series state when the deterioration parameter reaches the threshold value while charging using the power supply is being performed or after the charging has been completed.

In the above aspect, the deterioration parameter may be an inter-terminal voltage of the predetermined battery module when the charging has been completed.

The inter-terminal voltage of a target module may be an inter-terminal voltage of a single battery module or may be an inter-terminal voltage of a power storage assembly in which a part or all of a plurality of battery modules included in the battery system are connected in series or in parallel.

The inter-terminal voltage when external charging of a battery module has been completed decreases as deterioration of the battery module progresses (that is, as the degree of deterioration of the battery module increases). Accordingly, it is possible to detect the degree of deterioration of a battery module by detecting how much lower the current inter-terminal voltage of the battery module when external charging has been completed is than the inter-terminal voltage of the battery module when external charging has been completed in the initial state.

Particularly, when the ON-OFF states of the switches are fixed with a plurality of battery modules in the series state and the rated voltage of a series power storage assembly does not decrease sufficiently due to deterioration of the battery module, it is difficult to use the series power storage assembly for the application in which a parallel power storage assembly was used in the initial state. Accordingly, it is preferable to determine the fixing time based on the inter-terminal voltage of the target module.

In the above aspect, the electronic control unit may be configured to cancel fixing of the ON-OFF states when a cancel condition is satisfied; and the cancel condition may be satisfied when the electronic control unit receives a cancel instruction from a user.

As described above, in order to restrain the battery system from becoming unusable because switching control of a switch which is used to switch the connection mode of the battery modules is not possible, it is preferable that the ON-OFF state of each switch be fixed when the deterioration parameter has reached the threshold value and it is preferable that the fixed state is maintained thereafter. However, when each switch is fixed in a state in which switching control of the switch is possible and the fixing of each switch is not permitted to be cancelled after the fixing, user convenience is likely to be greatly decreased. There is a low likelihood that the switching operation of a switch based on an instruction from a user will be frequently performed. Therefore, user convenience may be increased by temporarily cancelling the fixing based on a cancel instruction from a user as described above. A condition for performing re-fixing after the fixing has been cancelled can be set to various kinds of condition. For example, the re-fixing may be performed at a time at which a predetermined time has elapsed after the fixing has been cancelled, or the re-fixing may be performed with performing of a predetermined process after the fixing has been cancelled as a trigger.

In the above aspect, the plurality of battery modules may include a first battery module and a second battery module; the plurality of switches may include a first relay that is disposed on a first electric wire connecting a positive electrode of the first battery module and a positive electrode of the second battery module, a second relay that is disposed on a second electric wire connecting the positive electrode of the first battery module and a negative electrode of the second battery module, and a third relay that is disposed on a third electric wire connecting a negative electrode of the first battery module and the negative electrode of the second battery module; a first node to which the first electric wire and the second electric wire are connected may be located closer to the positive electrode of the first battery module than the first relay; and a second node to which the second electric wire and the third electric wire are connected may be located closer to the negative electrode of the second battery module than the third relay.

With the plurality of battery modules and the plurality of switches, it is possible to switch between a series power storage assembly and a parallel power storage assembly with a simple configuration.

According to the disclosure, it is possible to provide a battery system that can be appropriately reduce the possibility of the battery system becoming unusable due to switching control of a switch, which is used to switch a connection mode of a plurality of battery modules, is not possible.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION

Hereinafter, an embodiment of the disclosure will be described in detail with reference to the accompanying drawings. The same or corresponding elements in the drawings will be referred to by the same reference signs and description thereof will not be repeated.

In the following description, it is assumed that a battery system according to this embodiment is applied to an electric vehicle. However, an application object of the battery system is not limited to an electric vehicle, but may be a hybrid vehicle. The application of the battery system is not limited to a vehicle, but may be a stationary power storage.

Figure 1:
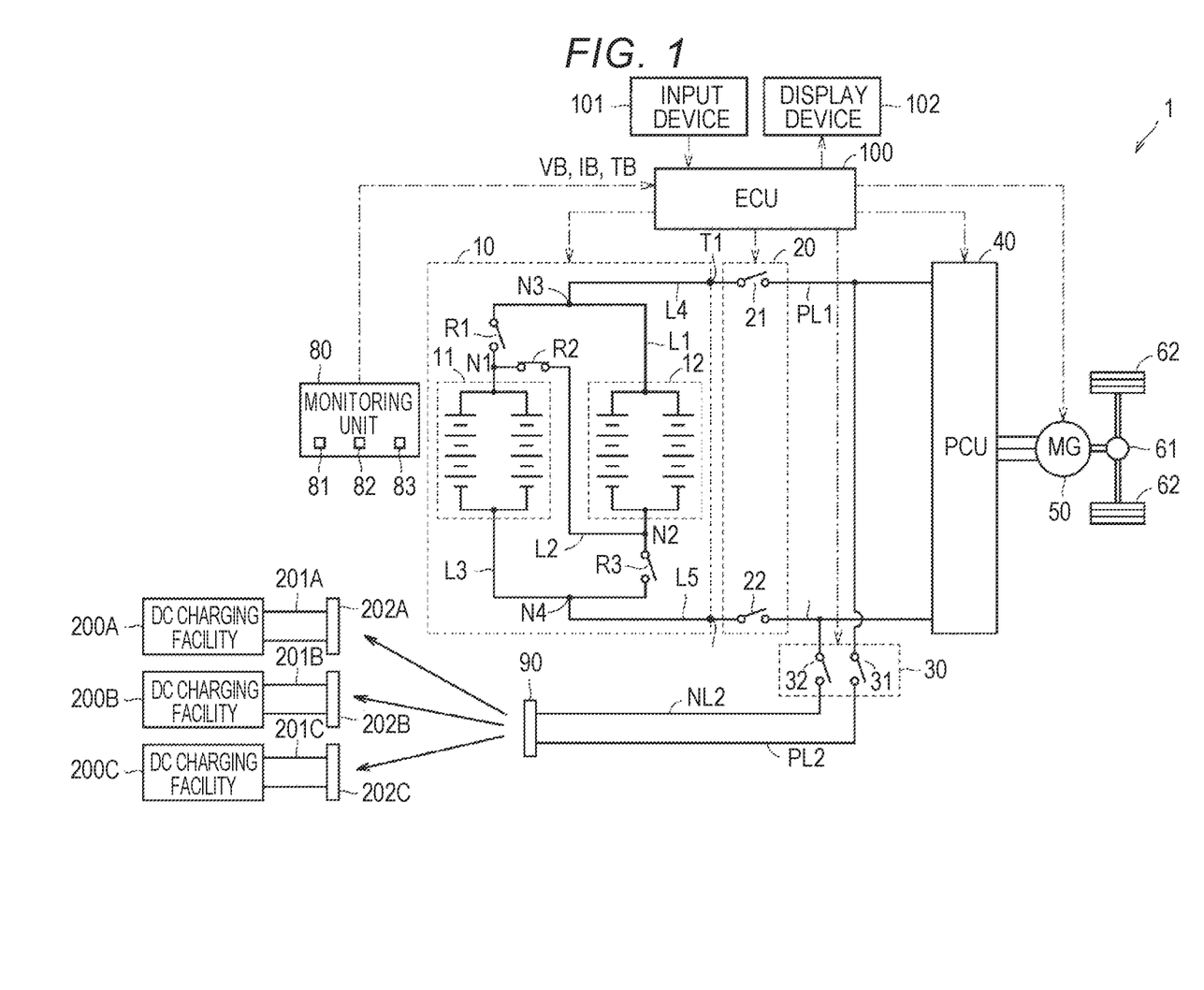
FIG. 1 is a diagram illustrating a configuration of a vehicle to which a battery system according to an embodiment of the disclosure is applied.

FIG. 1 is a diagram illustrating a configuration of a vehicle 1 (particularly, a circuit including battery modules 11 and 12) to which the battery system according to this embodiment is applied.

The vehicle 1 includes a power storage device 10, a main relay device 20, a charging relay device 30, a power control unit (hereinafter abbreviated to "PCU") 40, a motor generator (hereinafter abbreviated to "MG") 50, a power transmission gear 61, driving wheels 62, a monitoring unit 80, an inlet 90, an electronic control unit (hereinafter abbreviated to "ECU") 100, an input device 101, and a display device 102.

The vehicle 1 is configured to charge the power storage device 10 with electric power of an external power supply (for example, power supplies included in DC charging facilities 200A to 200C which will be described later) outside the vehicle. The vehicle 1 is an externally chargeable vehicle in which the power storage device 10 is mounted in an externally chargeable manner. Electric power which is generated by the MG 50 in addition to electric power which is supplied from the inlet 90 by external charging can be accumulated in the power storage device 10.

The power storage device 10 includes two battery modules 11 and 12 and three relays R1, R2, and R3 (hereinafter also referred to as "switching relays"). Each of the battery modules 11 and 12 includes a plurality of secondary batteries. Each secondary battery constituting the battery modules 11 and 12 may be referred to as a "cell." A plurality of cells which are connected in series may be referred to as a "cell array." The relays R1, R2, and R3 according to this embodiment correspond to an example of "switches" in the present disclosure.

A cell is a DC power source which is rechargeable. For example, a lithium ion battery can be employed as the cell. Here, a secondary battery other than a lithium ion battery (for example, a nickel hydride battery or an all-solid battery) may be employed as the cell.

In this embodiment, each of the battery modules 11 and 12 includes a plurality of cell arrays (for example, two cell arrays) which are connected in parallel. For example, a battery stack can be employed as a cell array. The configuration of the battery modules 11 and 12 can be arbitrarily changed. For example, each of the battery modules 11 and 12 may include one cell array. Alternatively, for example, each of the battery modules 11 and 12 may include one secondary battery.

The relays R1, R2, and R3 are arranged in a circuit including the battery modules 11 and 12 to be switchable between a series state and a parallel state. In the following description, a state in which a relay is in a closed state may be referred to as "ON" and a state in which a relay is in an open state may be referred to as "OFF."

The series state is a state in which the battery modules 11 and 12 are connected in series. When the relays R1, R2, and R3 are in OFF, ON, and OFF states, respectively, the battery modules 11 and 12 are in the series state.

The parallel state is a state in which the battery modules 11 and 12 are connected in parallel. When the relays R1, R2, and R3 are in ON, OFF, and ON states, respectively, the battery modules 11 and 12 are in the parallel state.

More specifically, the relay R1 is disposed on an electric wire L1 which connects a positive electrode of the battery module 11 and a positive electrode of the battery module 12. The relay R2 is disposed on an electric wire L2 which connects the positive electrode of the battery module 11 and a negative electrode of the battery module 12. The relay R3 is disposed on an electric wire L3 which connects the negative electrode of the battery module 11 and a negative electrode of the battery module 12. The electric wire L1 and the electric wire L2 are connected to each other at a node N1. The electric wire L2 and the electric wire L3 are connected to each other at a node N2.

An electric wire L4 which is connected to a positive terminal T1 of the power storage device 10 is connected to the electric wire L1 at a node N3. The relay R1 is located between the node N3 and the positive electrode of the battery module 11. The node N1 is located closer to the positive electrode of the battery module 11 than the relay R1. There is no switch between the node N3 and the positive electrode of the battery module 12. An electric wire L5 which is connected to a negative terminal T2 of the power storage device 10 is connected to the electric wire L3 at a node N4. The relay R3 is located between the node N4 and the negative electrode of the battery module 12. The node N2 is located closer to the negative electrode of the battery module 12 than the relay R3. There is no switch between the node N4 and the negative electrode of the battery module 11.

For example, an electromagnetic mechanical relay can be employed as a switching relay (the relays R1, R2, and R3). Here, a semiconductor relay which is also referred to as a solid state relay (SSR) may be employed as a switching relay. Examples of the semiconductor relay include a thyristor, a triac, and a relay constituted by a transistor (an IGBT, a MOSFET, or a bipolar transistor).

In this embodiment, each of the relays R1 to R3 is defined as a normally open switch. That is, each of the relays R1 to R3 is turned off in a state in which no voltage is applied thereto and is turned on by applying a voltage thereto.

The monitoring unit 80 is configured to monitor the state of the power storage device 10. The monitoring unit 80 includes a voltage sensor 81, a current sensor 82, and a temperature sensor 83. The voltage sensor 81 detects the inter-terminal voltage of the power storage device 10 (a battery voltage) and outputs the detected value VB to the ECU 100. The current sensor 82 detects a current flowing in the power storage device 10 (a battery current) and outputs the detected value IB to the ECU 100. The temperature sensor 83 detects a temperature of the power storage device 10 (a battery temperature) and outputs the detected value TB to the ECU 100. A charging current supplied from a DC charging facility to the power storage device 10 and a discharging current supplied from the power storage device 10 to a travel driving unit or the like can be detected by the current sensor 82.

The voltage sensor 81 and the temperature sensor 83 may be provided for each cell, may be provided for a plurality of cells, or may be provided for each battery module. When the sensors are provided for each cell constituting a battery module, a representative value (such as an average value, a median value, or a maximum value) of data detected for a plurality of cells can be used as a detected value for the corresponding battery module. A representative value (such as an average value, a median value, or a maximum value) detected for each of the battery modules 11 and 12 can be used a detected value for the power storage device 10.

The main relay device 20 is electrically connected to a current path which connects the power storage device 10 and the PCU 40 to each other. The main relay device 20 electrically sets up or cuts off the current path of the power storage device 10 based on a control signal from the ECU 100. When the SMRs 21 and 22 are in an OFF state, neither of charging and discharging of the power storage device 10 can be performed.

The main relay device 20 includes system main relays (hereinafter abbreviated to "SMRs") 21 and 22. The SMR 21 is provided on a power line PL1 connected to the positive terminal T1 of the power storage device 10. The SMR 22 is provided on a power line NL1 connected to the negative terminal T2 of the power storage device 10. Each of the SMRs 21 and 22 is turned off/on (OFF/ON) in accordance with a control signal from the ECU 100. When the SMRs 21 and 22 are in the OFF state, the current path connecting the power storage device 10 and the PCU 40 is cut off. When the SMRs 21 and 22 are in the ON state, the current path is set up, and transmission of electric power between the power storage device 10 and the PCU 40 can be performed.

The PCU 40 and the MG 50 constitute a travel driving unit of the vehicle 1. The travel driving unit is configured to convert electric power (electrical energy) supplied from the power storage device 10 into power (mechanical energy) for driving the driving wheels 62.

The PCU 40 includes an inverter and a converter (none of which is illustrated). Each of the inverter and the converter includes a plurality of switching elements (such as transistors) and is controlled in accordance with a control signal from the ECU 100.

An inter-terminal voltage (a voltage between the positive terminal T1 and the negative terminal T2) of the power storage device 10 varies depending on a connection state of the battery modules 11 and 12. Out of the power storage device 10 in which the battery modules 11 and 12 are in the series state (hereinafter referred to as the "power storage device 10 in the series state") and the power storage device 10 in which the battery modules 11 and 12 are in the parallel state (hereinafter referred to as the "power storage device 10 in the parallel state"), the inter-terminal voltage of the power storage device 10 in the parallel state is lower.

When the inter-terminal voltage of the power storage device 10 is lower than a drive voltage (or a power-generation voltage) of the MG 50, charging and discharging of the power storage device 10 are performed as follows. At the time of discharging of the power storage device 10, the converter steps up a voltage supplied from the power storage device 10 and supplies the stepped-up voltage to the inverter. The inverter converts DC power supplied from the converter into AC power and drives the MG 50. At the time of charging of the power storage device 10, the inverter converts AC power generated by the MG 50 into DC power and supplies the DC power to the converter. The converter steps down a voltage supplied from the inverter and supplies the stepped-down voltage to the power storage device 10.

The MG 50 is, for example, a three-phase AC rotary electric machine. An output torque of the MG 50 is transmitted to the driving wheels 62 via the power transmission gear 61 which is constituted by a reduction gear or the like. The MG 50 can also generate electric power using a rotational force of the driving wheels 62 at the time of regenerative braking of the vehicle 1. FIG. 1 illustrates a configuration including only one MQ, but the number of MGs is not limited thereto and a plurality of (for example, two) MGs may be provided.

The charging relay device 30 is provided in power lines PL2 and NL2 which branch from the power lines PL1 and NL1 connecting the power storage device 10 and the PCU 40 to each other and are connected to the inlet 90. The charging relay device 30 electrically sets up or electrically cuts off a current path connecting the power storage device 10 and the inlet 90 to each other based on a control signal from the ECU 100.

The charging relay device 30 includes charging relays (hereinafter abbreviated to "CHRs") 31 and 32. The CHR 31 is provided in a power line PL2 connected to the power line PL1. The CHR 32 is provided in a power line NL2 connected to the power line NL1. Each of the CHRs 31 and 32 is turned off/on (OFF/ON) in accordance with a control signal from the ECU 100. When the CHRs 31 and 32 are in the OFF state, the current path connecting the power storage device 10 and the inlet 90 is cut off. When the CHRs 31 and 32 are in the ON state, electric power can be supplied from the inlet 90 to the SMRs 21 and 22. When the SMRs 21 and 22 in addition to the CHRs 31 and 32 are in the ON state, the current path is set up and electric power can be supplied from the inlet 90 to the power storage device 10.

A connector (for example, a connector 202A, 202B, or 202C which will be described later) of a charging cable of a DC charging facility is connected to the inlet 90. The DC charging facility includes a DC power supply (not illustrated), and can supply DC power from the DC charging facility to the inlet 90 via the charging cable by connecting the connector of the charging cable to the inlet 90. When the SMRs 21 and 22 and the CHRs 31 and 32 are in the ON state, DC power supplied from the DC charging facility to the inlet 90 is directly supplied to the power storage device 10 without passing through a power conversion device (such as a converter) and the power storage device 10 is charged with the DC power.

The ECU 100 includes a central processing unit (CPU) which is an arithmetic processing device, a storage device, and an input and output port for inputting and outputting various signals (none of which is illustrated). The storage device of the ECU 100 includes a random access memory (RAM) which is a work memory and an archival storage (such as a read only memory (ROM) and a rewritable nonvolatile memory). By causing the CPU to execute a program stored in the storage device, various controls are embodied. Various controls which are executed by the ECU 100 are not limited to control processes using software, and may be embodied in dedicated hardware (an electronic circuit).

In the ECU 100, the CPU outputs acquired information (such as an operation result) to the storage device (for example, a rewritable nonvolatile memory) and stores the information in the storage device. The storage device of the ECU 100 may store information (such as a threshold value) which is used for traveling control of the vehicle 1 or charging control of the power storage device 10 in advance.

The input device 101 is a device that receives an instruction from a user. The input device 101 is operated by a user and outputs a signal corresponding to the user's operation to the ECU 100. A user can operate the input device 101 to transmit an instruction to the ECU 100. The communication between the ECU 100 and the input device 101 may be carried out through a cable or a wireless manner. The input device 101 is installed at a position which can be operated by a user who sits on a driver's seat (not illustrated) of the vehicle 1.

The input device 101 includes a screen operating unit to which an operation corresponding to a screen displayed on a display of the display device 102 which will be described later is input and a switch (hereinafter referred to as a "power switch") which is operated when driving of the vehicle 1 is started. In this embodiment, a touch panel is employed as the screen operating unit (not illustrated) and a push button switch is employed as the power switch (not illustrated). The disclosure is not limited thereto and a keyboard, a mouse, and the like can also be employed as the screen operating unit. A key switch, a slide switch, a lever, or the like can also be employed as the power switch. The screen operating unit may be an operation unit of an onboard car navigation system or may be an operation unit of a mobile device. Various mobile devices having a microcomputer built therein such as a smartphone, a smart watch, a notebook PC, a tablet terminal, and a portable game machine can be used as the mobile device.

The display device 102 is a device that displays information or a signal input from the ECU 100. The communication between the ECU 100 and the display device 102 may be carried out though a cable or a wireless manner. The display device 102 is installed at a position which is visible by a user who sits on a driver's seat (not illustrated) of the vehicle 1.

The display device 102 includes a display that displays a variety of information, a lamp (hereinafter referred to as a "READY lamp") notifying a user whether electric power is supplied to the travel driving unit (the PCU 40 or the like) of the vehicle 1 by turning on/off, and a lamp (hereinafter referred to as a "charging lamp") notifying a user whether the vehicle 1 is being externally charged by turning on/off.

The display may be display unit of a meter panel, may be a display unit of an onboard car navigation system, or may be a display unit of a mobile device (for example, various mobile devices having a microcomputer built therein). The display may have a speaker function.

With recent spread of an electric vehicle (an EV car) or a plug-in hybrid vehicle (a PHV car), preparation of infrastructure for charging a power storage device mounted in such a vehicle (hereinafter referred to as "charging infrastructure") has progressed. A power supply stand is installed as charging infrastructure in public facilities, commercial facilities, lodging facilities, parking lots (for example, a service area in an expressway), and the like. As general power supply stands, a standard charger and a quick charger are known.

A standard charger is an AC charging facility which can be installed at a low cost and is also installed in a house or the like. A typical standard charger includes a single-phase AC power source with a voltage of 200 V or 100 V and is configured to supply AC power with an output of about 3 kW (with a voltage of 200V and a maximum current of 15 A). The vehicle 1 may include a charger (not illustrated) which is used to perform external charging using a standard charger. That is, the power storage device 10 may be charged by converting AC power supplied from a standard charger into DC power with a voltage of about 500 V using a charger (not illustrated) mounted in the vehicle 1 and supplying the DC power to the power storage device 10.

The quick charger is a DC charging facility in which a time required for charging a power storage device is short. A typical quick charger includes a three-phase AC power source with a voltage of 200 V and is configured to convert AC power supplied from the power source into DC Power and to supply the DC power with a maximum output of 50 kW (with a maximum voltage of 500 V and a maximum current of 125 A).

Recently, an increase in power of a DC charging facility has progressed to further shorten the time required for charging a power storage device. An ultra-quick charger with a larger maximum output (for example, a maximum output larger than 100 kW) than that of a quick charger has been introduced.

FIG. 1 illustrates three types of DC charging facilities 200A to 200C. The DC charging facilities 200A, 200B, and 200C are include charging cables 201A, 201B, and 201C, respectively. Connectors 202A, 202B, and 202C are attached to the end of the charging cables 201A, 201B, and 201C, respectively. Each charging cable includes a power line and a communication line. When a power line can also be used as a communication line, a communication line may not be separately provided in the charging cable.

The DC charging facility 200A is a first example of an ultra-quick charger. The DC charging facility 200A is configured to supply DC power with a maximum output of 160 kW (with a maximum voltage of 400 V and a maximum current of 400 A).

The DC charging facility 200B is a second example of an ultra-quick charger. The DC charging facility 200B is configured to supply DC power with a maximum output of 160 kW (with a maximum voltage 800 V and a maximum current of 200 A).

The DC charging facility 200C is a third example of an ultra-quick charger. The DC charging facility 200C can supply both DC power with a high voltage (with a maximum output of 160 kW: with a maximum voltage 800 V and a maximum current of 200 A) and DC power with a low voltage (with a maximum output of 160 kW: with a maximum voltage 400 V and a maximum current of 400 A). The DC charging facility 200C is configured to supply one of the DC power with a high voltage and the DC power with a low voltage in response to a request from a user.

By increasing electric power output from a DC charging facility, it is possible to increase a charging speed. However, when high electric power with a low voltage is output from a DC charging facility, a current flowing in a charging cable (for example, the charging cable 201A, 201B, or 201C) increases. By supplying electric power from the inlet 90 connected to such a charging cable to a circuit of the vehicle 1 (an onboard circuit), a large current also flows in the onboard circuit. When the current flowing in the charging cable or the onboard circuit increases, a loss due to emission of heat is likely to increase and charging efficiency is likely to decrease. A DC charging facility which is installed as charging infrastructure can supply high power but may not have heat resistance with which the charging cable or the connector thereof can have resistance to emission of heat due to a large current.

In order to decrease a current flowing in the charging cable or the onboard circuit, employing of a power storage device with a high voltage may also be considered. However, when a power storage device with a high voltage is used as a power storage device that supplies electric power to the travel driving unit of the vehicle 1, power efficiency (a rate of electric power consumption) during traveling of the vehicle 1 is likely to decrease. For example, when a switching element of the PCU 40 is turned on and off in a state in which a high voltage is applied thereto, noise (ripples) is likely to be generated and a power loss is likely to increase.

Therefore, in the battery system according to this embodiment, a plurality of switching relays (the relays R1, R2, and R3) is arranged to be switchable between a series state and a parallel state in a circuit including the battery modules 11 and 12, and the ECU 100 (an electronic control unit) controls switching of the switching relays. By causing the ECU 100 to perform switching control of the switching relays, the connection mode of the battery modules 11 and 12 can be changed depending on the state of the vehicle 1. Switching control of the switching relays by the ECU 100 will be described below in detail.

Figure 2:
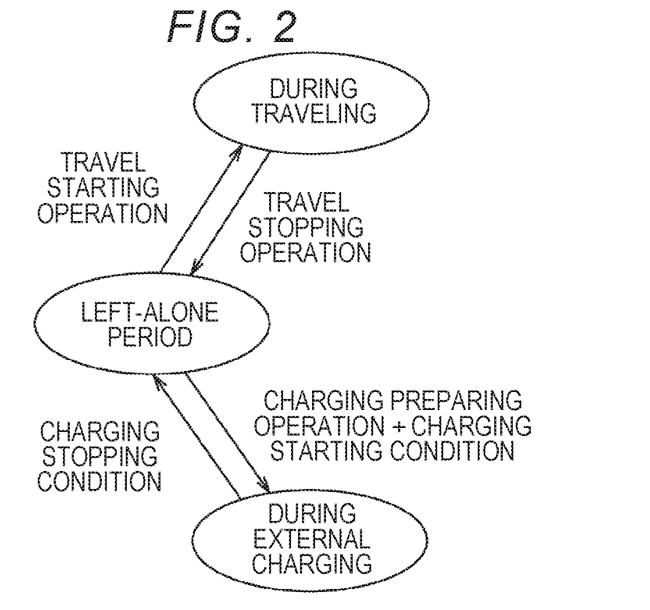
FIG. 2 is a diagram illustrating change of a state of the vehicle illustrated in FIG. 1.

FIG. 2 is a diagram illustrating change of a state of the vehicle 1. Referring to FIG. 2, the state of the vehicle 1 can be roughly classified into "traveling," "a left-alone period," and "external charging." When the vehicle 1 is "traveling," it means that the vehicle 1 is in a state in which electric power is supplied to the travel driving unit of the vehicle 1 (hereinafter also referred to as a "READY-ON state") and external charging is not performed on the vehicle 1. When the vehicle 1 is in a "left-alone period," it means that the vehicle 1 is in a state in which electric power is not supplied to the travel driving unit of the vehicle 1 (hereinafter also referred to as a "READY-OFF state") and external charging is not performed on the vehicle 1. When the vehicle 1 is "external charging," it means that external charging is being performed on the vehicle 1.

When a predetermined travel starting operation is performed on the vehicle 1 in the left-alone period, the SMRs 21 and 22 are turned on by the ECU 100 and the state of the vehicle 1 is traveling. When the vehicle 1 is in the READY-ON state, the READY lamp of the display device 102 is turned on. When the state of the vehicle 1 becomes traveling, the vehicle 1 can be made to travel by the travel driving unit. A user (a driver of the vehicle 1) can adjust an amount of driving of the travel driving unit by operating an accelerator pedal (not illustrated) or the like of the vehicle 1. In this embodiment, an operation of pressing a power switch of the input device 101 in a state in which a brake pedal (not illustrated) of the vehicle 1 is depressed is defined as the travel starting operation. In a hybrid vehicle, an operation of turning on an ignition switch may be defined as the travel starting operation.

When a predetermined travel stopping operation is performed on the vehicle 1 during traveling, the SMRs 21 and 22 are turned off by the ECU 100 and the state of the vehicle 1 is in the left-alone period. When the vehicle 1 is in the READY-off state, the READY lamp of the display device 102 is turned off. For example, when a user parks the vehicle 1 (stops driving the vehicle 1), the vehicle 1 is set to a non-drivable state (that is, a left-alone period). In this embodiment, an operation of long pressing the power switch of the input device 101 (continuously pressing the power switch for a predetermined time) in a state in which the brake pedal (not illustrated) of the vehicle 1 is depressed is defined as the travel stopping operation. In a hybrid vehicle, an operation of turning off an ignition switch may be defined as the travel stopping operation.

When a predetermined charging preparing operation is performed on the vehicle 1 in the left-alone period and a predetermined charging start condition has been satisfied, the SMRs 21 and 22 and the CHRs 31 and 32 are turned on by the ECU 100 and the state of the vehicle 1 is external charging. When the state of the vehicle 1 is external charging, the charging lamp of the display device 102 is turned on. In this embodiment, an operation of connecting a connector of a charging cable of a DC charging facility to the inlet 90 of the vehicle 1 is defined as the charging preparing operation. The charging start condition will be described later.

When a predetermined charging stop condition is satisfied in the vehicle 1 during external charging, the SMRs 21 and 22 and the CHRs 31 and 32 are turned off by the ECU 100 and the state of the vehicle 1 is the left-alone period. When the state of the vehicle 1 departs from external charging, the charging lamp of the display device 102 is turned off. The charging stop condition will be described later.

Switching control of the SMRs and the switching relays in the initial vehicle 1 (that is, the vehicle 1 in which deterioration of a battery module which will be described later has not occurred) will be described below with reference to FIGS. 3 to 6.

Figure 3:
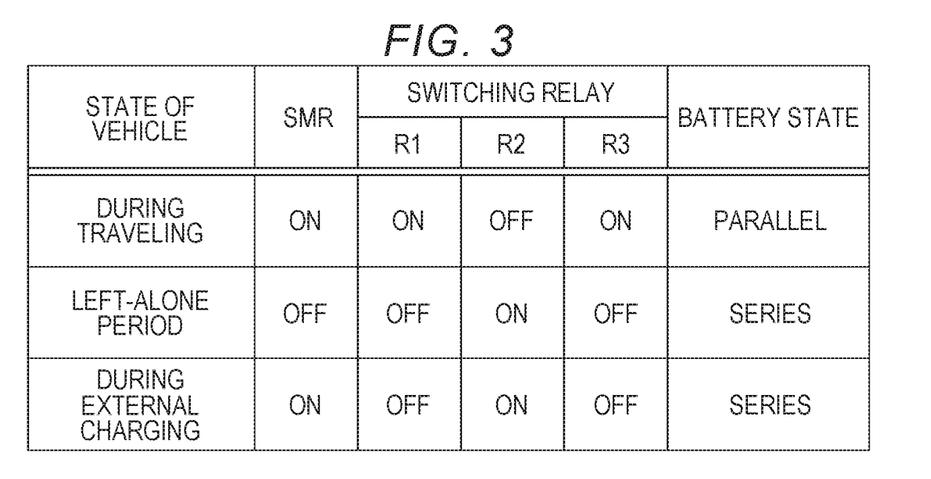
FIG. 3 is a diagram illustrating ON/OFF states of an SMR and a switching relay when an initial state of the vehicle is traveling, in a left-alone period, and external charging.

FIG. 3 is a diagram illustrating ON-OFF states of the SMRs and the switching relays when the initial vehicle 1 is traveling, in the left-alone period, and external charging.

Figure 4:
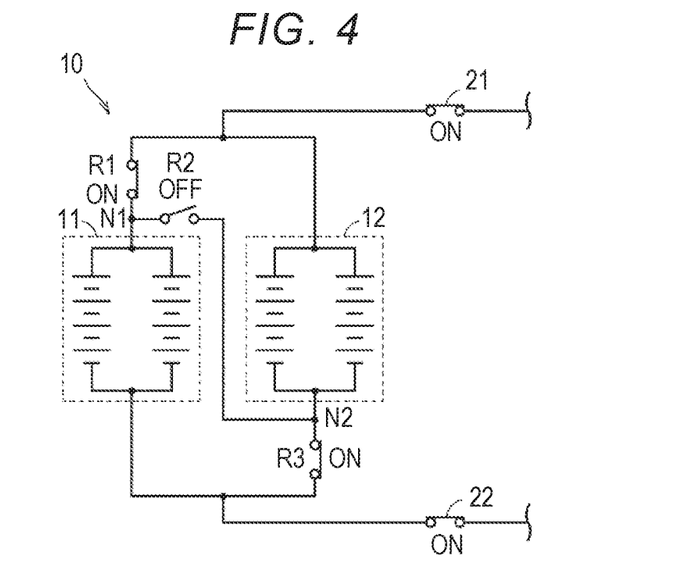
FIG. 4 is a diagram illustrating an SMR and a switching relay when the vehicle illustrated in FIG. 1 is traveling.

Referring to FIG. 3, when the vehicle 1 is traveling, the SMRs 21 and 22 are controlled to be in the ON state and the relays R1, R2, and R3 are controlled to be in the ON state, the OFF state, and the ON state, respectively, by the ECU 100. FIG. 4 is a diagram illustrating the SMRs and the switching relays in such ON-OFF states. As illustrated in FIG. 4, when the vehicle 1 is traveling, the battery modules 11 and 12 are in the parallel state.

Figure 5:
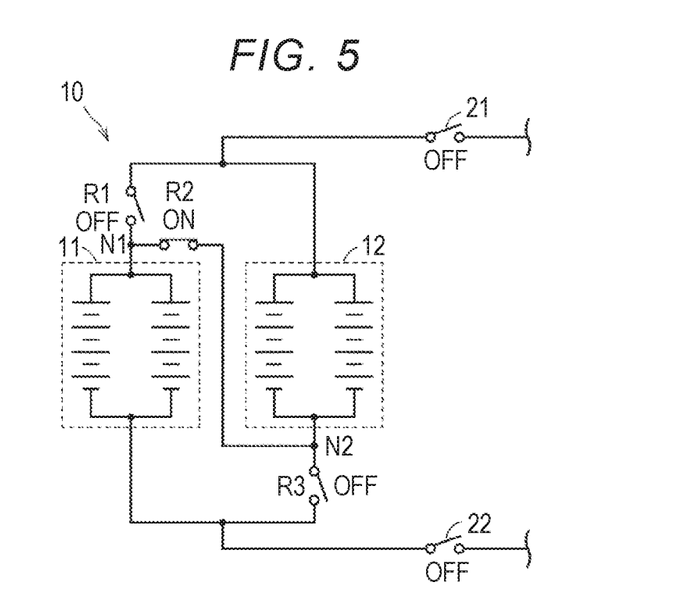
FIG. 5 is a diagram illustrating an SMR and a switching relay when the vehicle illustrated in FIG. 1 is left alone.

Referring back to FIG. 3, when the vehicle 1 is in the left-alone period, the SMRs 21 and 22 are controlled to be in the OFF state and the relays R1, R2, and R3 are controlled to be in the OFF state, the ON state, and the OFF state, respectively, by the ECU 100. FIG. 5 is a diagram illustrating the SMRs and the switching relays in such ON-OFF states. As illustrated in FIG. 5, when the vehicle 1 is in the left-alone period, the battery modules 11 and 12 are in the series state.

Figure 6:
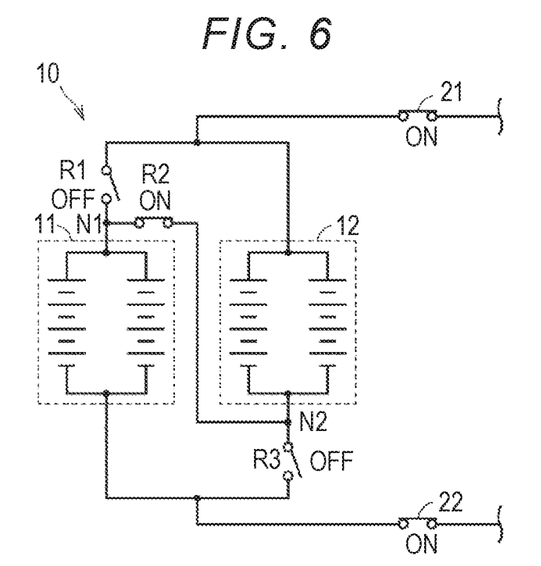
FIG. 6 is a diagram illustrating an SMR and a switching relay when the vehicle illustrated in FIG. 1 is being externally charged.

Referring back to FIG. 3, when the vehicle 1 is external charging, the SMRs 21 and 22 are controlled to be in the ON state and the relays R1, R2, and R3 are controlled to be in the OFF state, the ON state, and the OFF state, respectively, by the ECU 100. FIG. 6 is a diagram illustrating the SMRs and the switching relays in such ON-OFF states. As illustrated in FIG. 6, when the vehicle 1 is external charging, the battery modules 11 and 12 are in the series state.

When the vehicle 1 is external charging, the inter-terminal voltage of the power storage device 10 can be increased by switching the battery modules 11 and 12 to the series state using the switching relays. The power storage device 10 in the series state can be charged by a DC charging facility that supplies electric power with a high voltage. Accordingly, it is possible to decrease a current flowing in the charging cable or the onboard circuit during external charging. By decreasing a current for supply of power, it is possible to improve charging efficiency.

On the other hand, when the vehicle 1 is traveling, the inter-terminal voltage of the power storage device 10 can be decreased by switching the battery modules 11 and 12 to the parallel state using the switching relays. By supplying electric power with a low voltage from the power storage device 10 in the parallel state to the travel driving unit of the vehicle 1, it is possible to increase power efficiency (a rate of electric power consumption) in traveling of the vehicle 1.

In this embodiment, it is assumed in the initial vehicle 1 that the rated voltage (an SOC of 0% to 100%) of the power storage device 10 in the series state range from 600 V to 800 V and the rated voltage (an SOC of 0% to 100%) of the power storage device 10 in the parallel state range from 300 V to 400 V. The SOC is defined as a ratio (for example, percentage) of a current charging capacity to a full-charging capacity.

Switching control of a switch which is used in the battery system may not be possible. For example, when a switching operation of a switching relay is frequently performed, deterioration of the switching relay is likely to progress. When deterioration of a switching relay progresses and the switching relay is stuck closed or stuck open, the ECU 100 cannot control switching of the switching relay. When switching control of the switching relay is not possible, the battery modules 11 and 12 cannot be switched to a desired connection state. Accordingly, it may be difficult to continuously use the battery system depending on ON-OFF states of the switching relays when switching control thereof is not possible. For example, when the relay R1 is stuck closed, the battery modules 11 and 12 cannot be switched to the series state. When the relay R1 is stuck open, the battery modules 11 and 12 cannot be switched to the parallel state. When two or more switching relays are stuck open, the battery modules 11 and 12 may not be switched to neither the series state nor the parallel state.

In order to restrain sticking of a switching relay, employing of a switching relay having high durability may also be considered. However, since a component with high functionality has a high cost, employing a switching relay with high durability causes an increase in cost of components.

Therefore, in the battery system according to this embodiment, the ECU 100 (an electronic control unit) is configured to execute the following control.

The ECU 100 detects a deterioration parameter indicating a degree of deterioration of the battery modules 11 and 12, determines whether the detected deterioration parameter has reached a threshold value, and fixes the ON-OFF states of the relays R1, R2, and R3 such that the battery modules 11 and 12 are in the series state when it is determined that the deterioration parameter has reached the threshold value. In this embodiment, the inter-terminal voltage of the power storage device 10 when external charging has been completed is employed as the deterioration parameter.

When an ON-OFF state of a switching relay is fixed, a switching operation of the switching relay is not performed and thus deterioration of the switching relay is restrained. However, when an ON-OFF state of a switching relay is fixed, the connection state of the battery modules 11 and 12 cannot be changed and thus it is not preferable that the fixing time be excessively early. On the other hand, when the fixing time is excessively late, sticking of the switching relay may occur.

In the battery system according to this embodiment, the ECU 100 fixes the ON-FF states of the switching relays at a time at which the deterioration parameter is determined to have reached the threshold value. That is, the ECU 100 determines the time at which the ON-OFF states of the switching relays are fixed using the degree of deterioration of the battery modules 11 and 12. The switching relays are used in the substantially same environment and conditions as the battery modules 11 and 12. Based on this fact, the degree of deterioration of each switching relay can be estimated from the degree of deterioration of the battery modules 11 and 12. Accordingly, the ECU 100 can fix the ON-OFF states of the switching relays at a time which is slightly earlier than the time at which deterioration of the switching relays has progressed to cause sticking. For example, a value obtained by experiment or the like in advance can be set as the threshold value which is used for deterioration determination.

By fixing the ON-OFF states of the switching relays (the relays R1, R2, and R3) at an appropriate time as described above, it is possible to restrain deterioration of the switching relays before the switching relays have been stuck while enabling change of the connection state of the battery modules 11 and 12 for a long time. Accordingly, it is possible to appropriately reduce the possibility of the battery system becoming unusable due to switching control of the switching relays, which are used to switch the connection mode of the battery modules 11 and 12, being not possible.

When a switch relay can operate appropriately at a time at which the deterioration parameter is determined to have reached the threshold value, the switching relay does not have to have more durability. Accordingly, it is possible to reduce a cost for components by employing cheap switching relays.

In the battery system according to this embodiment, when it is determined that the deterioration parameter has reached the threshold value, the ON-OFF states of the relays R1, R2, and R3 are fixed such that the battery modules 11 and 12 are in the series state. Accordingly, during traveling as well as in the left-alone period and during external charging of the vehicle 1, the battery modules 11 and 12 are in the series state. The rated voltage of the battery modules 11 and 12 decreases as deterioration of the battery modules 11 and 12 progresses. That is, in a situation in which deterioration of the battery modules 11 and 12 has progressed, the rated voltage of the power storage device 10 in the series state decreases in comparison with that in the initial state. Accordingly, even when the power storage device 10 in the series state is used during traveling of the vehicle 1, a large power loss is not caused.

In the power storage device 10 in the series state, only the relay R2 out of the relays R1 to R3 is turned on (see FIGS. 5 and 6). Since each of the relays R1 to R3 is a normally open switch, a voltage is applied to only the relay R2 out of the relays R1 to R3 in the power storage device 10 in the series state. On the other hand, in the power storage device 10 in the parallel state, a voltage is applied to the relays R1 and R3 out of the relays R1 to R3. Accordingly, when the ON-OFF states of the relays are fixed such that the battery modules 11 and 12 are in the series state, power consumption is less than that when the ON-OFF states of the relays are fixed such that the battery modules 11 and 12 are in the parallel state.

Note that the configuration in which each of the relays R1 to R3 is a normally open switch is not essential. For example, a normally open switch may be employed as the relays R1 and R3 and a normally closed switch may be employed as the relay R2. By employing this configuration, it is possible to switch the battery modules 11 and 12 to the series state without applying a voltage to the relays R1 to R3.

Figure 7:
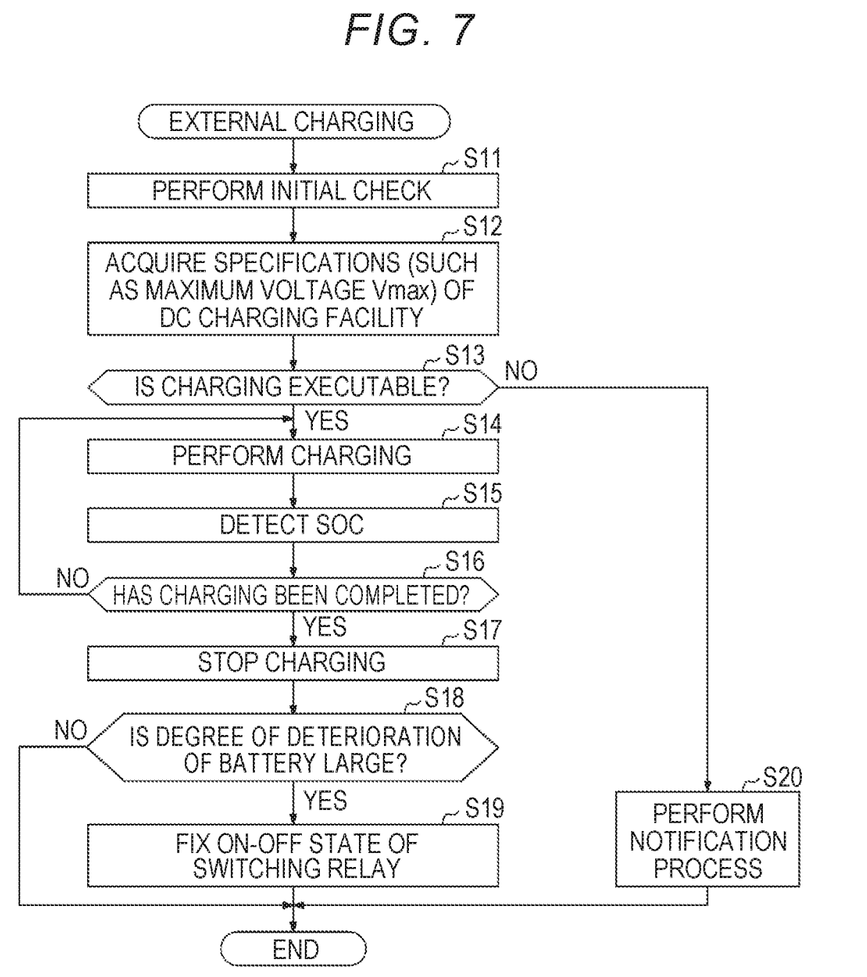
FIG. 7 is a flowchart illustrating a routine of charging control which is performed by a controller of the battery system according to an embodiment of the disclosure.

Charging control by the ECU 100 when the power storage device 10 is charged using the DC charging facility 200C will be described below in detail with reference to FIG. 7. FIG. 7 is a flowchart illustrating a routine of charging control which is performed by the ECU 100 in a situation in which the ON-OFF states of the relays R to R3 are not fixed. When the vehicle 1 is in the left-alone period, the routine illustrated in FIG. 7 is performed by the main routine by performing the above-mentioned charging preparing operation and performing a predetermined operation (for example, an operation of pressing a button of "charging execution" displayed on a touch panel of the DC charging facility) on the DC charging facility 200C. When the vehicle 1 is in the left-alone period, the battery modules 11 and 12 are in the series state (see FIG. 5). Even when the charging preparing operation has been performed, the battery modules 11 and 12 are kept in the series state. In the battery system in which the battery modules 11 and 12 are in the parallel state when the vehicle 1 is in the left-alone state, when the charging preparing operation has been performed, the ON-OFF states of the relays R1 to R3 may be changed by the ECU 100 such that the battery modules 11 and 12 are in the series state.

In this embodiment, the charging preparing operation corresponds to an operation for starting charging using an external power supply. By this charging preparing operation, the inlet 90 of the vehicle 1 and the connector 202C of the charging cable 201C of the DC charging facility 200C are connected. Accordingly, the vehicle 1 and the DC charging facility 200C are communicatively connected to each other. The communication therebetween may be carried out though various kinds of manner, such as a controller area network (CAN) or power line communication (PLC).

In this embodiment, a condition in which the predetermined operation on the DC charging facility 200C is performed and it is determined in step S13 which will be described later that external charging can be executed corresponds to the charging start condition.

Referring to FIG. 7, first, the ECU 100 performs initial check (Step S11). The initial check is to check whether a charging path between the DC charging facility 200C and the power storage device 10 is normal. The initial check includes, for example, self-checking of whether there is an electrical malfunction in the vehicle 1 and contact check between the inlet 90 and the connector 202C.

Then, the ECU 100 acquires specifications of the DC charging facility 200C (Step S12). In this embodiment, the ECU 100 acquires a maximum voltage Vmax (a suppliable maximum charging voltage) of the DC charging facility 200C as the specifications of the DC charging facility 200C. The maximum voltage Vmax of the DC charging facility 200C is 800 V.

The ECU 100 determines whether execution of external charging is possible based on the check result in Step S11 and the specifications of the DC charging facility 200C acquired in Step S12 (Step S13).

When it is determined in Step S13 that execution of external charging is not possible (NO in Step S13), the ECU 100 controls the display device 102 such that a user is notified of a message indicating that execution of external charging is not possible (Step S20).

For example, when an abnormality has been found in the charging path in Step S11, the ECU 100 determines that external charging cannot be executed in Step 1S3. When the specifications of the DC charging facility 200C do not support charging of the power storage device 10 (for example, when the maximum voltage Vmax of the DC charging facility 200C is excessively higher or excessively lower than the rated voltage of the power storage device 10 in the series state), the ECU 100 determines that execution of external charging is not possible in Step S13. The maximum voltage Vmax of the DC charging facility 200C supports charging of the power storage device 10 in the series state. When the vehicle 1 is connected to the DC charging facility 200A, not to the DC charging facility 200C, the maximum voltage of the DC charging facility is excessively low and thus it is determined that the specifications of the DC charging facility do not support charging of the power storage device 10 in Step S13. The ECU 100 may notify a user of the reason thereof along with the message indicating that execution of external charging is not possible in Step S20.

A notification method to a user is arbitrary, the message or the reason may be notified by display (of characters, an image, or the like) or may be notified by turning on a predetermined lamp (which includes flickering the predetermined lamp). After the notification process has been performed in Step S20, the routine is returned to the main routine.

When it is determined in Step S13 that execution of external charging is possible (YES in Step S13), the state of the vehicle 1 is set to external charging in Step S14 and external charging of the power storage device 10 is executed. The DC charging facility 200C receives the rated voltage of the power storage device 10 from the vehicle 1 and selects DC power with a high voltage corresponding to charging of the power storage device 10 in the series state as supply power from DC power with a low voltage and DC power with a high voltage. The SMRs 21 and 22 and the CHRs 31 and 32 are turned on by the ECU 100 and charging of the power storage device 10 is performed with the DC power with a high voltage (with a maximum voltage of 800 V and a maximum current of 200 A) supplied from the DC charging facility 200C. When the vehicle 1 is external charging, the battery modules 11 and 12 are in the series state (see FIG. 6).

In this embodiment, when it is determined in Step S11 that the charging path is normal and the specifications of the DC charging facility 200C support charging of the power storage device 10, the ECU 100 determines that execution of external charging is possible in Step S13.

The ECU 100 continues to execute external charging using the DC charging facility 200C until it is determined in Step S16 that charging has been completed (Steps S14 to S16). That is, while it is determined in Step S16 that charging has not been completed (NO in Step S16), external charging is executed.

The ECU 100 detects the SOC of the power storage device 10 during external charging (Step S15). As a method of measuring the SOC, for example, various known methods such as a method based on integration of a current value (a coulomb count) or a method based on estimation of an open-circuit voltage (OCV) can be employed.

In Step S16, the ECU 100 determines whether charging has been completed based on whether a predetermined charging stop condition has been satisfied. That is, the ECU 100 determines that charging has been completed when the charging stop condition has been satisfied. The charging stop condition is satisfied, for example, when the SOC of the power storage device 10 becomes greater than a predetermined threshold value during external charging. The threshold value may be automatically set by the ECU 100 or the like or may be set by a user. In this embodiment, the charging stop condition is satisfied when the SOC of the power storage device 10 reaches 100% (fully charged).

The charging stop condition can be arbitrarily set. For example, when an execution time of external charging (an elapsed time after external charging has been first started in Step S14) is greater than a predetermined threshold value, the charging stop condition may be set to be satisfied. The charging stop condition may be set to be satisfied when an instruction to stop charging has been given via the input device 101 by a user during external charging.

When it is determined in Step S16 that charging has been completed (YES in Step S16), the state of the vehicle 1 is the left-alone period. That is, the ECU 100 stops external charging by turning off the SMRs 21 and 22 and the CHRs 31 and 32 (Step S17).

Subsequently, the ECU 100 detects the inter-terminal voltage of the power storage device 10 (an inter-terminal voltage when it is fully charged) using the detected value VB of the voltage sensor 81 and performs the deterioration determination using the inter-terminal voltage (Step S18). More specifically, the ECU 100 determines whether the inter-terminal voltage detected as described above when the power storage device 10 is fully charged reaches a predetermined threshold value. In this embodiment, 480 V corresponding to 60% of the initial value (800 V) of the rated voltage of the power storage device 10 in the series state is set as the threshold value. The threshold value which is used in Step S18 can be arbitrarily set. The threshold value may be a fixed value or may be a value varying depending on the battery temperature or the like.

When the inter-terminal voltage of the power storage device 10 when it is fully charged is equal to or greater than the threshold value (480 V), it is determined that the degree of deterioration of the battery modules 11 and 12 is small (NO in Step S18), fixing of the ON-OFF states of the switching relays is not performed, and the routine is returned to the main routine.

When the inter-terminal voltage of the power storage device 10 when it is fully charged is less than the threshold value (480 V), it is determined that the degree of deterioration of the battery modules 11 and 12 is large (YES in Step S18), and fixing of the ON-OFF states of the switching relays is performed in Step S19. Thereafter, the routine is returned to the main routine. In this embodiment, in a state in which the battery modules 11 and 12 are in the series state, the ON-OFF states of the relays R1, R2, and R3 are fixed by the process of Step S19. When the process of Step S19 is performed, the switching operations of the relays R1, R2, and R3 are prohibited. Before the ON-OFF states of the relays are fixed, the battery modules 11 and 12 are switched to the series state even in a period in which the battery modules 11 and 12 are in the parallel state (for example, during traveling). Accordingly, when the state of the vehicle 1 is any one of the left-alone period, external charging, and traveling, the battery modules 11 and 12 are in the series state.

According to the routine illustrated in FIG. 7, the ON-OFF states of the switching relays (the relays R1, R2, and R3) can be fixed at an appropriate time. Accordingly, it is possible to restrain deterioration of the switching relays before the switching relays are stuck while enabling change of the connection state of the battery modules 11 and 12 for a long time. Accordingly, it is possible to appropriately reduce the possibility of the battery system becoming unusable due to switching control of the switching relays, which are used to switch the connection mode of the battery modules 11 and 12, being not possible. Even when switching control of a switch which is used for the battery system is not possible for a reason other than sticking (such as open circuit), the same advantages can be achieved.

Even in a situation in which the ON-OFF states of the relays R1 to R3 are fixed, charging control of the power storage device 10 can be executed basically in the same way as the routine illustrated in FIG. 7. Since the ON-OFF states of the switching relays are already fixed, the process associated with fixing (Steps S18 and S19) may be skipped.

Figure 8:
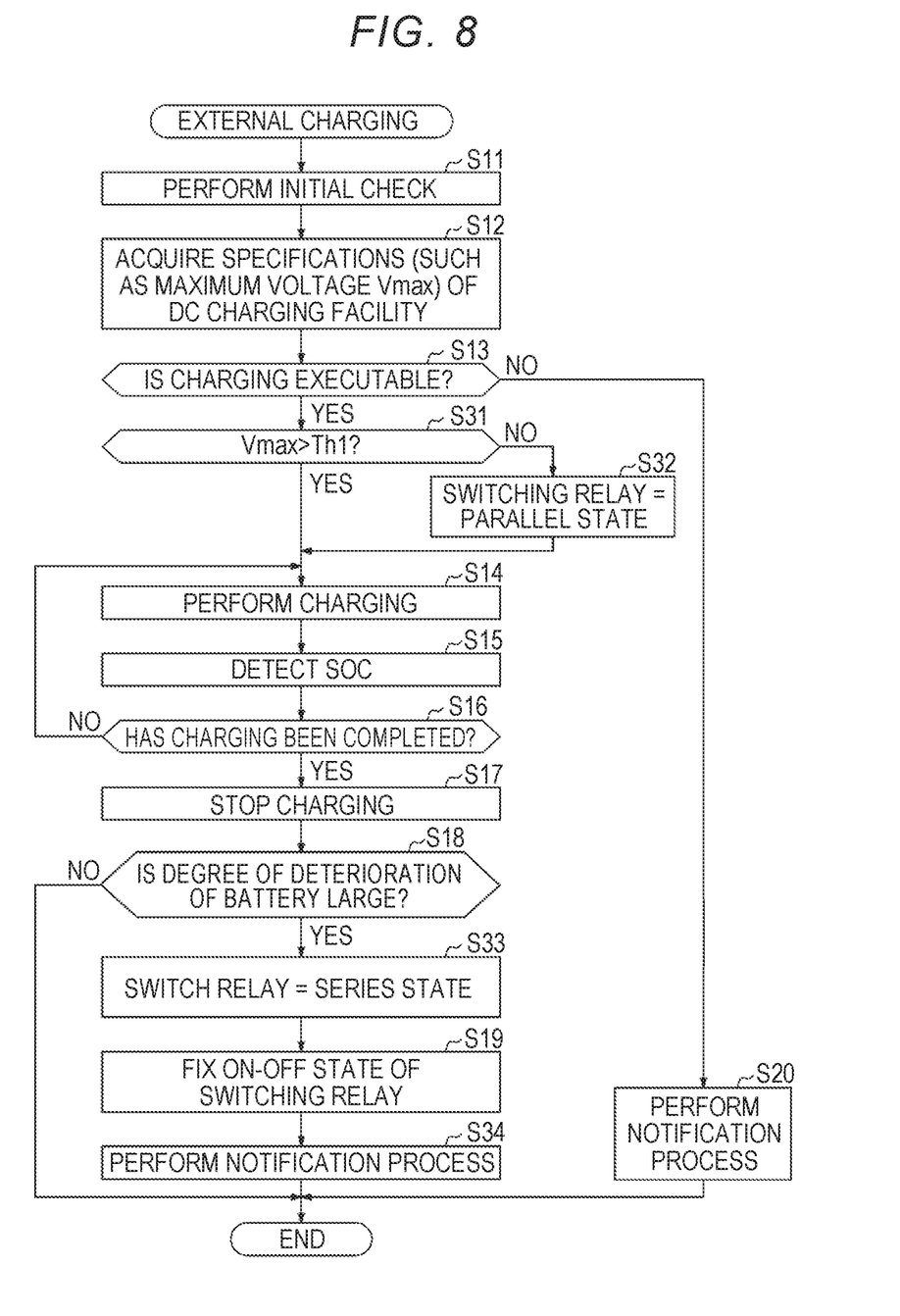
FIG. 8 is a flowchart illustrating a modified example of the routine illustrated in FIG. 7.

In the routine illustrated in FIG. 7, external charging of the power storage device 10 is always executed in the series state. However, the disclosure is not limited thereto, and the external charging of the power storage device 10 may be executed in the parallel state. FIG. 8 is a flowchart illustrating a modified example of the routine illustrated in FIG. 7. As illustrated in FIG. 8, Steps S31 to S34 may be added to the routine illustrated in FIG. 7.

Referring to FIG. 8, in this modified example, Steps S31 and S32 are performed between Steps S13 and S14. The connection mode (series/parallel) of the battery modules 11 and 12 is switched based on the specifications of a DC charging facility by Steps S31 and S32.

In Step S13, when the maximum voltage Vmax of the DC charging facility supports charging of the power storage device 10 in one of the series state and the parallel state, it is determined that the specifications of the DC charging facility support charging of the power storage device 10. That is, when the vehicle 1 is connected to one of the DC charging facilities 200A to 200C, it is determined that the specifications of the DC charging facility support charging of the power storage device 10.

In Step S31, the ECU 100 determines whether the maximum voltage Vmax of the DC charging facility is greater than a predetermined threshold value Th1. In this modified example, the threshold value Th1 is set to 600 V. That is, when the vehicle 1 is connected to the DC charging facility 200A (with a maximum voltage of 400 V), it is determined that the maximum voltage Vmax of the DC charging facility is equal to or less than the threshold value Th1. When the vehicle 1 is connected to one of the DC charging facility 200B (with a maximum voltage of 800 V) and the DC charging facility 200C (with a maximum voltage of 800 V), it is determined that the maximum voltage Vmax of the DC charging facility is greater than the threshold value Th1. The threshold value Th1 can be arbitrarily set. The threshold value Th1 may be a fixed value or may be variable depending on the situation of the vehicle 1 or the like.

When it is determined that the maximum voltage Vmax of the DC charging facility is greater than the threshold value Th1 (YES in Step S31), the routine transitions to Step S14 with the power storage device 10 maintained in the series state. On the other hand, when it is determined that the maximum voltage Vmax of the DC charging facility is equal to or less than the threshold value Th1 (NO in Step S31), the ECU 100 controls the relays R1 to R3 in Step S32 such that the power storage device 10 is switched to the parallel state and then the routine transitions to Step S14. Steps S14 to S17 in FIG. 8 are the same as in Steps S4 to S17 in FIG. 7.

In Step S18, the ECU 100 determines whether the inter-terminal voltage of the power storage device 10 when it is fully charged has reached a predetermined threshold value Th2. Here, the threshold value Th2 is changed depending on the connection state (series/parallel) of the power storage device 10. For example, when the power storage device 10 is in the series state, similarly to the routine illustrated in FIG. 7, 480 V corresponding to 60% of the initial value (800 V) of the rated voltage of the power storage device 10 in the series state is set as the threshold value Th2. When the power storage device 10 is in the parallel state, 240 V corresponding to 60% of the initial value (400 V) of the rated voltage of the power storage device 10 in the parallel state is set as the threshold value Th2.

When the inter-terminal voltage of the power storage device 10 when it is fully charged is equal to or greater than the threshold value Th2 (NO in Step S18), it is determined that the degree of deterioration of the battery modules 11 and 12 is small, fixing of the ON-OFF states of the switching relays is not performed, and the routine is returned to the main routine.

On the other hand, when the inter-terminal voltage of the power storage device 10 when it is fully charged is less than the threshold value Th2 (YES in Step S18), it is determined that the degree of deterioration of the battery modules 11 and 12 is large and the routine transitions to Step S33. By the process of Step S33, the power storage device 10 is switched to the series state before fixing of the ON-OFF states of the switching relays (Step S19) is performed. When the power storage device 10 is already in the series state, the switching operations of the relays R1 to R3 are not performed and the routine transitions to Step S19 with the power storage device 10 maintained in the series state. When the power storage device 10 is in the parallel state, the ECU 100 controls the relays R1 to R3 in Step S33 such that the power storage device 10 is switched to the series state, and then the routine transitions to Step S19. Step S19 in FIG. 8 is the same as Step S19 in FIG. 7.

After fixing of the ON-OFF states of the switching relays has been performed in Step S19, the ECU 100 controls the display device 102 such that a user is notified that the ON-OFF states of the relays R1 to R3 are fixed to switch the battery modules 11 and 12 to the series state (Step S34). Thereafter, the routine is returned to the main routine.

The method of notifying a user in Step S34 is arbitrary. For example, user guidance for guiding a user to the DC charging facility supporting charging of the power storage device 10 in the fixed series state may be performed. A map around the vehicle 1 may be displayed on the display of the display device 102 and the user may be guided to the DC charging facility supporting charging of the power storage device 10 in the series state out of the DC charging facilities on the displayed map. For example, when there are DC charging facilities 200A to 200C around the vehicle 1, the user may be guided to the DC charging facilities 200B and 200C supporting charging of the power storage device 10 in the series state. The guidance may be performed using display (characters, an image, or the like) or using sound.

In the above-mentioned embodiment and the modified example, the inter-terminal voltage of the power storage device 10 when external charging has been completed is employed as the deterioration parameter. Specifically, the inter-terminal voltage of the power storage device 10 when it is fully charged is used as the deterioration parameter. However, in a battery system in which external charging can be stopped before the power storage device 10 is fully charged, the SOC when external charging has been completed cannot be said to be 100%. When external charging has been stopped before the power storage device 10 is fully charged, the SOC when external charging has been completed (the SOC when the charging stop condition has been satisfied) is less than 100%. In such a battery system in which external charging can be stopped before the power storage device 10 is fully charged, the threshold value which is used in Step S18 may vary depending on the SOC when external charging has been completed. For example, information (such as a map) indicating a relationship between the threshold value used in Step S18 and the SOC when external charging has been completed may be stored in the storage device of the ECU 100 in advance and the threshold value corresponding to the SOC when the charging stop condition has been satisfied may be used in Step S18 with reference to the information.

Instead of the inter-terminal voltage of the power storage device 10, an inter-terminal voltage of one battery module (the battery module 11 or 12) included in the power storage device 10 may be employed or an inter-terminal voltage of one cell included in the battery modules 11 and 12 may be employed.

The deterioration parameter is not limited to the inter-terminal voltage at the predetermined SOC, but other parameters associated with the degree of deterioration of the battery modules 11 and 12 may be employed. Examples of other parameters include a capacity of the power storage device 10 (a power storage assembly in which the battery modules 11 and 12 are connected), a capacity of one battery module included in the power storage device 10, a capacity of one cell included in the battery modules 11 and 12, a traveling distance of the vehicle 1, and a time elapsed after use of the battery system has been started.

The ECU 100 may be configured to temporarily cancel the fixing when a cancel condition has been satisfied after fixing of the ON-OFF states of the switching relays has been performed in Step S19. The cancel condition is satisfied when a cancel instruction from a user is received by the ECU 100.

For example, the input device 101 may include a switch which his operated when fixing of the On-OFF states of the switching relays is cancelled (hereinafter referred to as a "fixing cancel switch"). By allowing a user to operate the fixing cancel switch, a cancel instruction is input to the ECU 100. For example, when a DC charging facility connected to the vehicle 1 does not support charging of the power storage device 10 in the series state but supports charging of the power storage device 10 in the parallel state, a user may operate the fixing cancel switch to send a cancel instruction to the ECU 100 such that the fixing can be cancelled. By employing this configuration, external charging of the power storage device 10 can be performed with the power storage device 10 set to the parallel state. Re-fixing may be performed with execution of external charging (completion of external charging) after the fixing has been cancelled as a trigger.

In the above-mentioned embodiment and the modified example, the ON-OFF states of the switching relays are fixed such that the battery modules 11 and 12 are in the series state. However, the disclosure is not limited thereto, and the ON-OFF states of the switching relays may be fixed such that the battery modules 11 and 12 are in the parallel state.

When the battery modules 11 and 12 are in the parallel state in a situation in which the ON-OFF states of the switching relays are fixed, it is thought that the battery current in the left-alone period of the vehicle 1 decreases and determination of the battery modules 11 and 12 is restrained.

The configuration illustrated in FIG. 1 may be changed depending on the type of the vehicle in which the battery system is mounted or the like. For example, the number of battery modules constituting the power storage device 10 is not limited to two and can be arbitrarily changed within a range of two or greater. For example, the power storage device 10 in the series state and the parallel state may be configured such that three or more battery modules are connected in series and in parallel.

In the configuration illustrated in FIG. 1, the charging relay device 30 is connected between the main relay device 20 and the PCU 40, but the charging relay device 30 may be connected between the power storage device 10 and the main relay device 20.

The embodiment disclosed therein is exemplary in all respects but is not restrictive. The scope of the disclosure includes all modifications within meanings and scopes equivalent to the disclosure.

What is claimed is:

1. A battery system comprising:
   a plurality of battery modules;
   a plurality of switches configured to switch a connection state of the plurality of battery modules between a series state and a parallel state, the series state being a state in which the plurality of battery modules is connected in series, the parallel state being a state in which the plurality of battery modules is connected in parallel; and
   an electronic control unit configured:
      to control switching of the plurality of switches; and
      to stop switching ON-OFF states of the plurality of switches such that the connection state of the plurality of battery modules is the series state or the parallel state until receiving a cancel instruction from a user, in response to a deterioration parameter indicating a degree of deterioration of a predetermined battery module out of the plurality of battery modules reaching a threshold value, the ON-OFF state representing a state in which a switch is open or closed.

2. The battery system according to claim 1, wherein:
   the electronic control unit is configured to resume switching of the ON-OFF states in response to an activation of a fixing cancel switch by the user.

3. The battery system according to claim 1, wherein:
   the plurality of battery modules includes a first battery module and a second battery module;
   the plurality of switches includes a first relay that is disposed on a first electric wire connecting a positive electrode of the first battery module and a positive electrode of the second battery module, a second relay that is disposed on a second electric wire connecting the positive electrode of the first battery module and a negative electrode of the second battery module, and a third relay that is disposed on a third electric wire connecting a negative electrode of the first battery module and the negative electrode of the second battery module;
   a first node to which the first electric wire and the second electric wire are connected is located closer to the positive electrode of the first battery module than the first relay; and a second node to which the second electric wire and the third electric wire are connected is located closer to the negative electrode of the second battery module than the third relay.

4. The battery system according to claim 1, wherein:
the plurality of battery modules is configured to be able to be charged with electric power of a power supply outside the plurality of battery modules; and
the electronic control unit is configured to:
   maintain or change the ON-OFF states of the plurality of switches such that the connection state of the plurality of battery modules is the series state when an operation for starting charging using the power supply has been performed in a situation in which the ON-OFF states of the plurality of switches continue switching; and
   stop switching the ON-OFF states of the plurality of switches such that the connection state of the plurality of battery modules is the series state in response to the deterioration parameter reaching the threshold value while charging using the power supply is being performed or after the charging has been completed.

5. The battery system according to claim 4, wherein the deterioration parameter is an inter-terminal voltage of the predetermined battery module when the charging has been completed.

6. The battery system according to claim 1, wherein the electronic control unit is configured to stop switching the ON-OFF states of the plurality of switches such that the connection state of the plurality of battery modules is the series state when the deterioration parameter reaches the threshold value.

7. The battery system according to claim 6, wherein:
the plurality of battery modules is configured to be able to be charged with electric power of a power supply outside the plurality of battery modules; and
the electronic control unit is configured to:
   maintain or change the ON-OFF states of the plurality of switches such that the connection state of the plurality of battery modules is the parallel state when an operation for starting charging using the power supply has been performed in a situation in which the ON-OFF states of the plurality of switches continue switching and a voltage of the power supply is equal to or lower than a predetermined voltage value; and
   stop switching the ON-OFF states of the plurality of switches such that the connection state of the plurality of battery modules is the series state in response to the deterioration parameter reaching the threshold value while charging using the power supply is being performed or after the charging has been completed.

8. The battery system according to claim 7, wherein the deterioration parameter is an inter-terminal voltage of the predetermined battery module when the charging has been completed.

* * * * *

UNITED STATES PATENT AND TRADEMARK OFFICE
CERTIFICATE OF CORRECTION

PATENT NO. : 10,978,888 B2
APPLICATION NO. : 16/253794
DATED : April 13, 2021
INVENTOR(S) : Tomoya Ono Page 1 of 1

It is certified that error appears in the above-identified patent and that said Letters Patent is hereby corrected as shown below:

In the Specification

In Column 1, Line(s) 24, before "discloses", delete "UP 2013-81316 A)" and insert --(JP 2013-81316 A)--.

In Column 15, Line(s) 13, delete "ON-FF" and insert --ON-OFF--, therefor.

In Column 16, Line(s) 20, after "relays", delete "R" and insert --R1--, therefor.

Signed and Sealed this
Sixth Day of July, 2021

Drew Hirshfeld
*Performing the Functions and Duties of the
Under Secretary of Commerce for Intellectual Property and
Director of the United States Patent and Trademark Office*